(12) United States Patent
Chan et al.

(10) Patent No.: US 7,208,247 B2
(45) Date of Patent: Apr. 24, 2007

(54) INTERCONNECT FOR RECHARGEABLE COMPUTER BATTERIES

(75) Inventors: Seng Chan, Suwanee, GA (US); Charles W. Friedli, Lawrenceville, GA (US); Due Q. Huynh, Lawrenceville, GA (US); William B. Kiger, Duluth, GA (US); Kevin Maggert, Lawrenceville, GA (US)

(73) Assignee: Motorola Inc., Schaumburg, IL (US)

( * ) Notice: Subject to any disclaimer, the term of this patent is extended or adjusted under 35 U.S.C. 154(b) by 599 days.

(21) Appl. No.: 10/608,318

(22) Filed: Jun. 27, 2003

(65) Prior Publication Data

US 2004/0265687 A1 Dec. 30, 2004

(51) Int. Cl.
*H01M 2/20* (2006.01)
*H01R 3/00* (2006.01)

(52) U.S. Cl. .................. 429/158; 429/159; 439/500

(58) Field of Classification Search ............. None
See application file for complete search history.

(56) References Cited

U.S. PATENT DOCUMENTS 4,347,294 A * 8/1982 Mejia ................... 429/151
6,724,170 B1 * 4/2004 Maggert et al. ........... 320/107

* cited by examiner

*Primary Examiner*—Jonathan Crepeau
(74) *Attorney, Agent, or Firm*—Hisashi D. Watanabe

(57) ABSTRACT

An improved electrical interconnect member for rechargeable battery packs is provided. The interconnect member includes a metal tab and a plastic housing. The metal tab preferably includes side bends projecting below the tab in a non-perpendicular geometric orientation with the top of the tab. The tab includes at least one lance for preventing post-assembly, lateral movement between the tab and housing. The housing is preferably Y-shaped, with the outer surfaces of the Y having concave curvatures. The concave curvatures allow the housing to seat between adjoining, cylindrical cells. The housing includes a rail with a cross section that corresponds to the area between the side bends and the top of the tab. The housing also includes a post for coupling to the lances.

14 Claims, 10 Drawing Sheets

INTERCONNECT FOR RECHARGEABLE COMPUTER BATTERIES

BACKGROUND

Technical Field

This invention relates generally to rechargeable batteries for laptop computers, and more specifically to a system for interconnecting cells and circuits within such a rechargeable battery pack.

Background Art

Notebook style, or "laptop", computers are becoming more and more popular. Prices for these small, portable computers now rival those of their larger, bulkier, desktop model predecessors. Students and business people enjoy the ability to work on their computers while on the go. Manufacturers have even responded to the demand for laptop computers by introducing new products like "tablet" style computers that allow users to write on the screen with a special pen, thereby emulating a tablet of paper.

Laptop computers derive their portability from rechargeable batteries. The rechargeable batteries, from the outside, sometimes resemble interchangeable computer components like CD-ROM or floppy disk drives. One such example is shown in U.S. Design Pat. No. D440201. These designs make the batteries easy to insert into standard bays within the laptop computer.

The inside of these batteries, however, is quite complex. The batteries typically include from six to ten individual cells, coupled in parallel and series combinations. Additionally, these batteries generally include sophisticated circuitry, including battery protection circuits, microprocessor circuits, fuel gauging circuits and charging circuits. These circuits are typically mounted on a rigid printed circuit board. The board may include some form of standard connector that couples to the laptop computer.

A problem exists in that it is difficult to connect the cells, which are often packaged in cylindrical steel cans, to the printed circuit board. By far the most popular way to connect the cells to the board is by hand soldering a flexible wire from a metal tab welded to the can, to the printed circuit board. The problem with this hand soldering method is reliability. If the soldering technician is not diligent, cold solder joints may result, thereby compromising reliability of the battery pack. Additionally, solder balls and bridges may short elements within the battery pack, again compromising reliability.

There is thus a need for an improved interconnect system within computer battery packs.

DETAILED DESCRIPTION OF THE INVENTION

Figure 1:
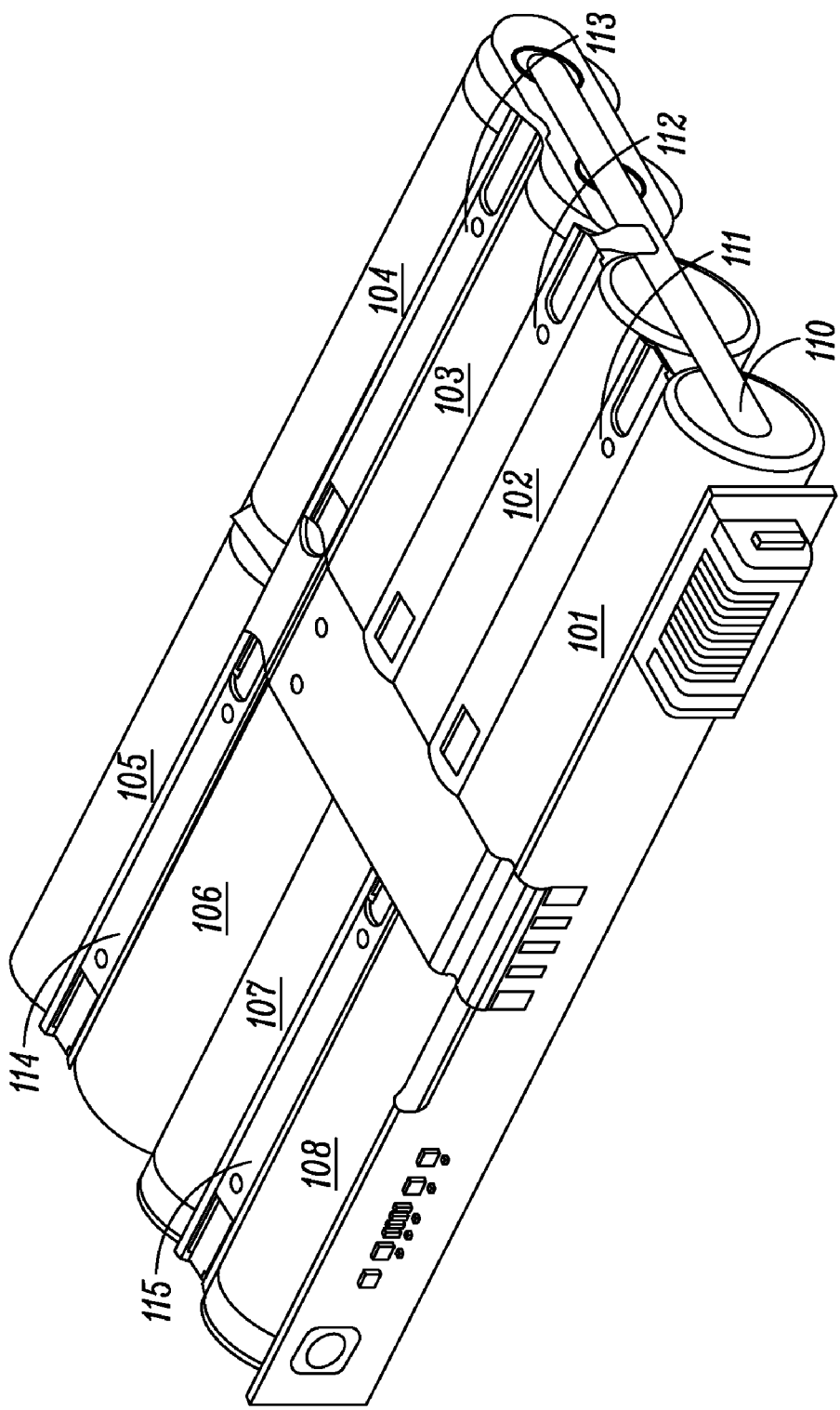
FIG. 1 is an isometric view of a battery pack assembly employing insert molded interconnects.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Commonly assigned, application Ser. No. 10/298,097, filed Nov. 16, 2002, now U.S. Pat. No. 6,724,170 entitled "Interconnect System for Rechargeable Computer Batteries", which is incorporated herein by reference, teaches a battery interconnect system. The system, illustrated in FIG. 1, includes a plurality of battery cells 101–108 interconnected by a flexible circuit 109, tabs 110 and a plurality of "runners" 111–115. The interconnect system of FIG. 1 offers many advantages over prior art batteries interconnected with hand soldered wires, including increased manufacturing efficiency, lower manufacturing defect rate, and higher reliability.

One important component of the interconnect system of FIG. 1 is the runner, e.g. 111. This component is referred to as a "runner", in that it forms an electrical connection that "runs" from the flexible metal tabs 110 to the bus 109. An isometric view of the runner implemented in the earlier application is illustrated in FIG. 2.

Figure 2:
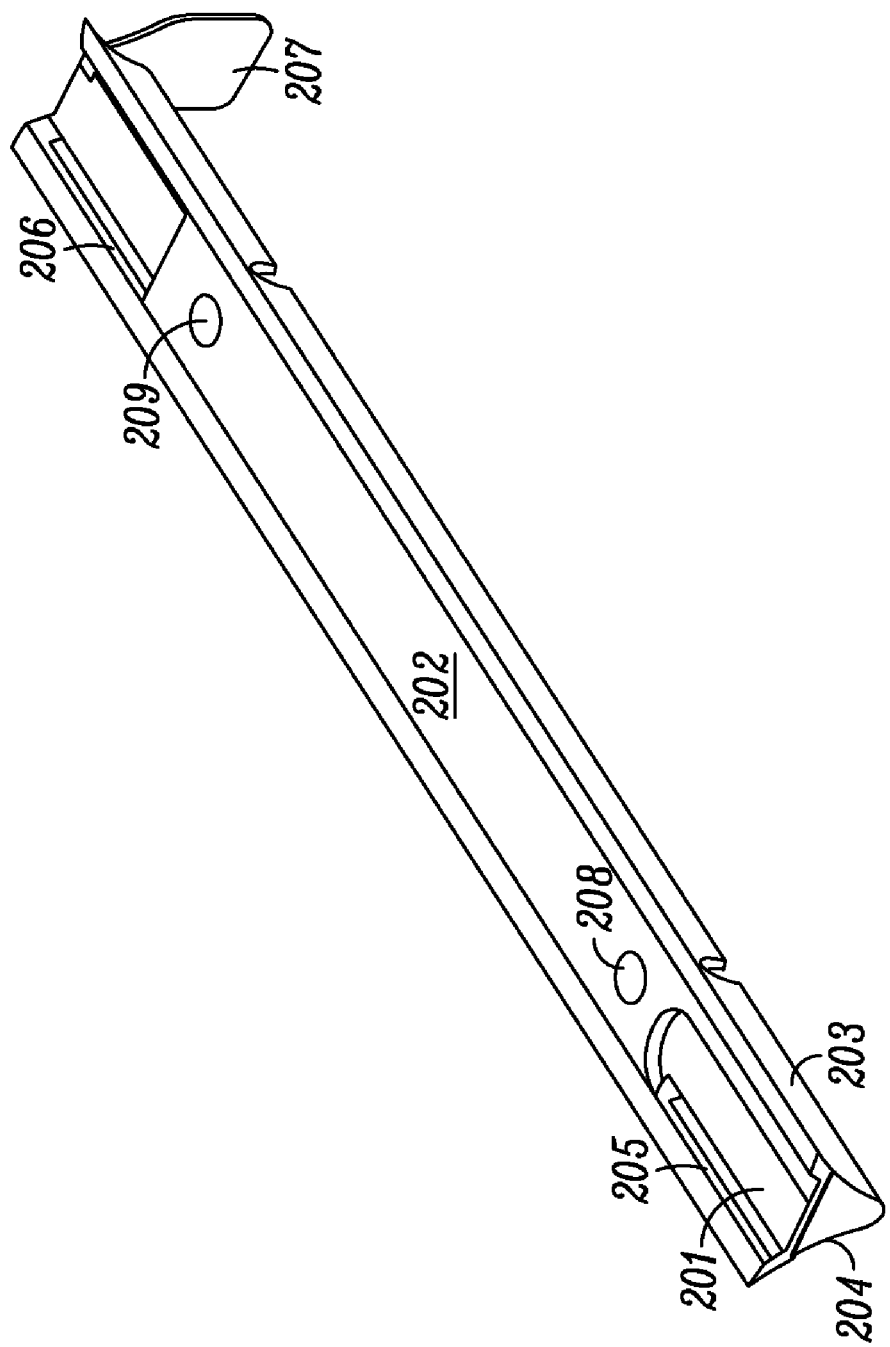
FIG. 2 is an isometric view of an insert molded interconnect.

The runner of FIG. 2 includes a plastic casing 202 that encompasses a metal tab 201. The plastic casing 202 is roughly triangular in cross section, with two of the sides 203, 204 having concave curvatures to mate between pairs of cylindrical cells. By way of example, if 18–650 cells (so named for their cylindrical shape with an 18 mm diameter and 65 mm length) are used in the battery pack, the concave curvatures of sides 203, 204 would have 9 mm radii, neglecting tolerances, to accommodate the outer curves of the cell. The plastic housing is made from any of a number of plastics, including styrene, polystyrene, ABS, polycarbonates and the like. A preferred plastic is Noryl GTX 830. Noryl GTX 830, while more expensive than other plastics, is preferred due to its reduced vapor emissions during the parallel welding process.

The flexible metal tab 201 is similar to those used to couple cells together (as in element 110 of FIG. 1). The flexible metal tab 201 is exposed through two apertures 205, 206 in the plastic casing 202. The apertures 205–206 allow machine welding as will be described below. The flexible tab 201 preferably includes a perpendicular member 207 for coupling to the tabs in a battery pack.

The preferred method of manufacturing the runner of FIG. 2 is insert molding. In this method, the flexible metal tab 201 is inserted into the cavity of a mold, whereupon molten plastic is injected about the tab 201. Tooling holes 208, 209 are included to maintain tab 201 location during plastic flow. While this method is effective, it can slow the overall manufacturing rate. Each time a set of parts is run, an operator must insert (by hand) the metal tabs 201 into a tool prior to the injection of plastic. Thus, whenever insert molded parts are manufactured, the manufacturing efficiency is reduced (when compared to the run rate for plain plastic parts) due to the manual operations involved.

The present invention offers an improved runner design. With this invention, the metal tab and plastic housing may be manufactured independently and coupled together at a later time. The improved design allows the runner to be manufactured with less plastic, thereby reducing the overall cost. The improved design further offers an increased welding area, thereby providing both designers and operators increased flexibility during the welding process.

Another advantage is that the invention allows both metal tabs with the perpendicular member (element 207 of FIG. 2), and those without, to be coupled to a single, symmetric housing as needed. This particular improvement reduces battery cost by replacing specialized components, like an insert molded interconnect with a perpendicular tab, with general ones, like the symmetric housing that may be coupled to multiple tabs.

Figure 3:
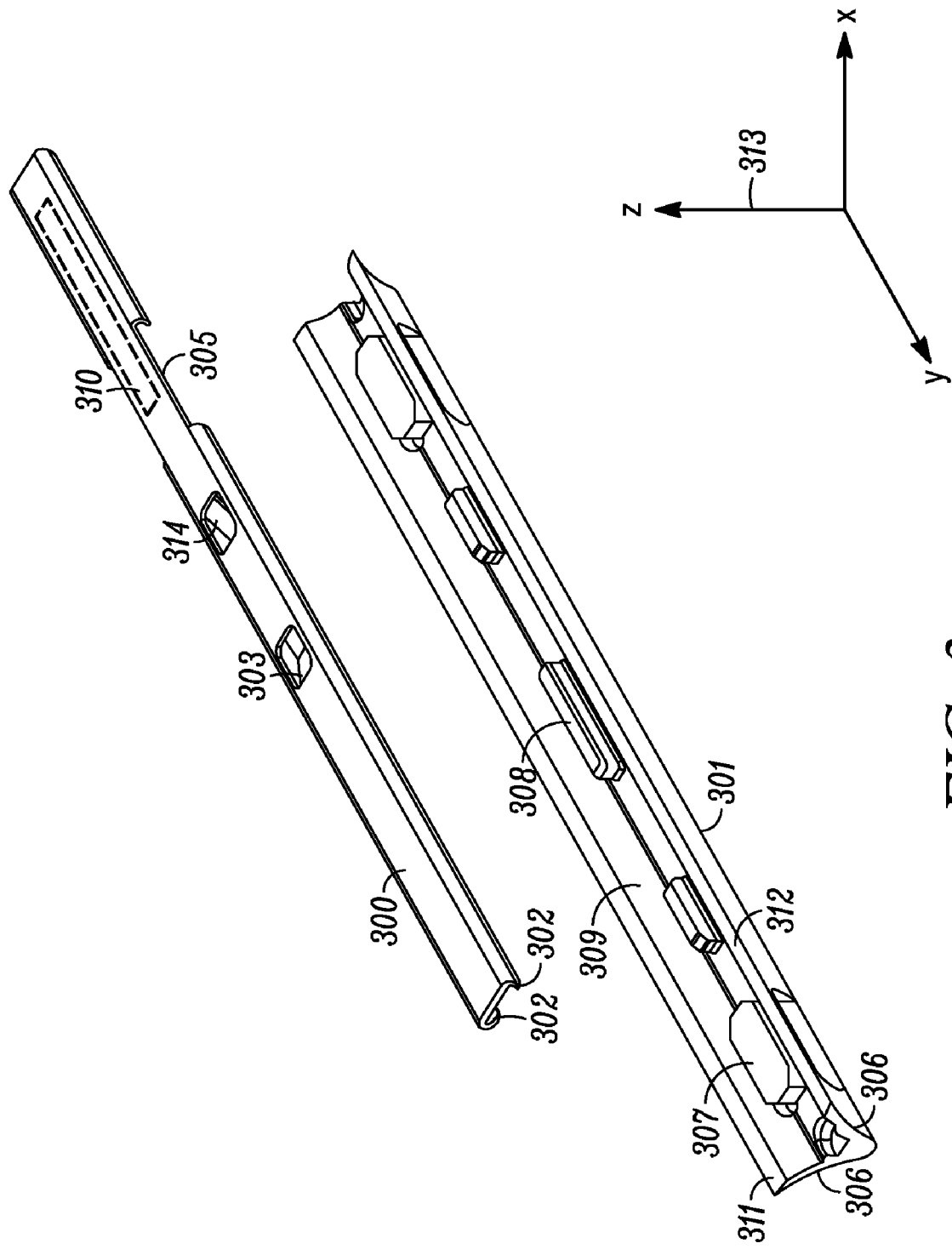
FIG. 3 is an exploded, isometric view of an interconnect in accordance with the invention.

The improved runner is shown in FIG. 3. A metal tab 300 having side bends 302 projecting beneath the metal tab 300. The side bends 302 are preferably bent so as to be non-perpendicular with the top of the tab, the top being the surface represented by section 310. This non-perpendicular alignment allows the side bends 302 to clamp to an object having non-perpendicular sides. The metal tab 300 preferably is manufactured from a metal like the nickel 200 alloy. The metal tab 300 is less than 1 mm thick, preferably 0.25 mm thick, neglecting tolerances.

The side bends 302 preferably include at least one cut out section 305. The cut out section 305 aids in assembly, as will be explained below. The metal tab further includes at least one lance 303. The lance 303 is preferably formed by bending a small section of the top 310 of the tab 300 downward, at an angle less than perpendicular with the top 310 of the tab 300.

The housing 301 has a generally Y-shaped in cross section, with the sides 311, 312 having outer concave curvatures 306 to couple to pairs of cylindrical cells. By way of example, if 18–650 cells are used in the battery pack, the concave curvatures of sides 306 would have 9 mm radii, neglecting tolerances, to accommodate the outer curves of the cell. The housing 301 is made from any of a number of plastics, including styrene, polystyrene, Noryl GTX 830, ABS, polycarbonates and the like. A preferred plastic is ABS. Note that this design allows the use of ABS, which is less expensive than the Noryl plastic used with the interconnect of FIG. 2. Since there is no insert molding associated with the present invention, the need for a plastic with reduced vapor emissions no longer exists.

Figure 7:
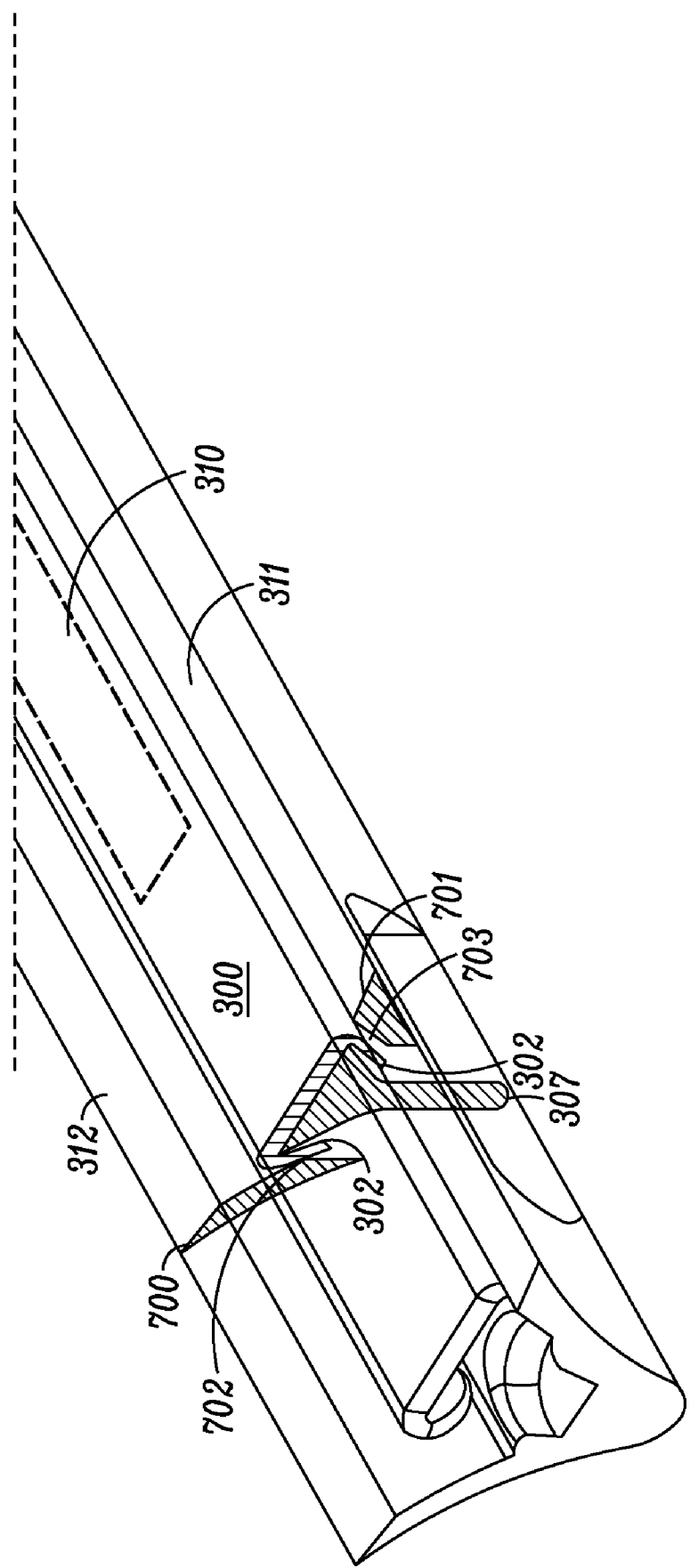
FIG. 7 is a sectional, isometric view of an interconnect in accordance with the invention.

Referring to FIG. 7, the interior portions 700, 701 of the sides 311, 312 may be crimped, thereby causing the side bends 302 to more securely couple to the rail 307. As the housing 301 is preferably manufactured from a plastic, this crimping provides a small amount of friction to help keep the tab 300 securely coupled to the rail 307, thereby preventing lateral movement relative to the housing 301.

Referring again to FIG. 3, the housing 301 includes at least one rail 307 for coupling to the tab 300. The rail 307 preferably does not run the length of the housing, but is rather cut into sections. The rail 307 has a cross section that corresponds to the alignment of the side bends 302. The sections have enough length to provide adequate resistance to pull forces acting in the z-direction 313.

For example, referring to FIG. 7, if the alignment of the side bends 302 forms a "C" shape with the top 310 of the tab 300, the cross section of the rail 307 would be roughly triangular so as to fit within the space between the side rails 302 and the top 310 of the tab 300.

Referring again to FIG. 3, the housing 301 further includes a post 308 for coupling to the lance 303. Where two lances are used, for instance lance 303 and lance 314, the length of the post 308 is roughly equal to or slightly less than the distance between the lances 303, 314.

Figure 4:
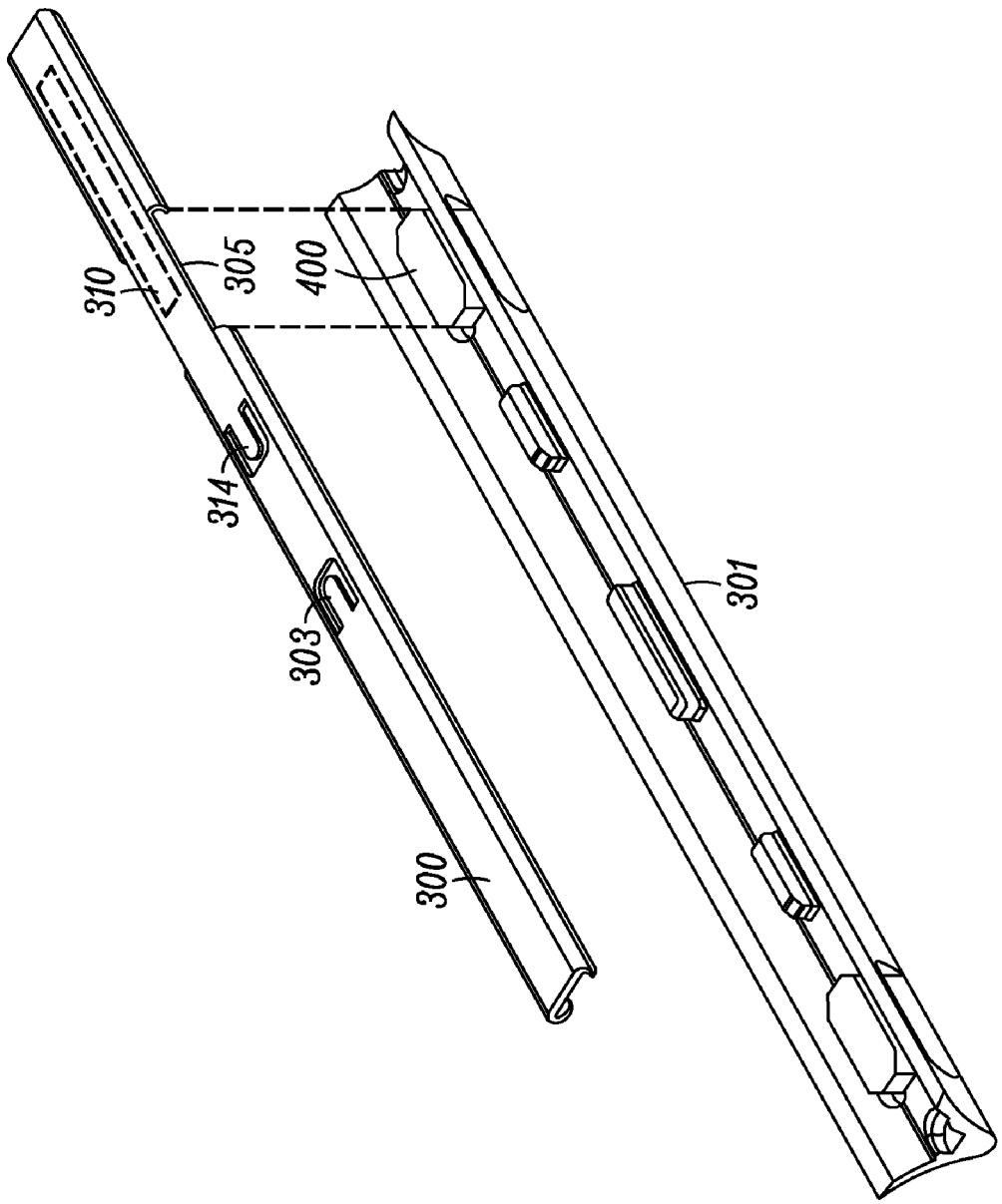
FIG. 4 is a pre-assembly, exploded, isometric view of an interconnect in accordance with the invention.

Assembly of the tab 300 and housing 301 is simple and straightforward. Referring to FIG. 4, the tab 300 is positioned over the housing 301 such that the cut out 305 is aligned over one of the rails 400. Note that if the cut out 305 were not present, the tab 300 would be required to slide over the rail 400 across the length of the housing 301. The cut out 305 thus speeds assembly by reducing overall tab travel. Note also that the lances 303, 314 are parallel with the top 310 of the tab 300 at this point in the assembly.

Figure 5:
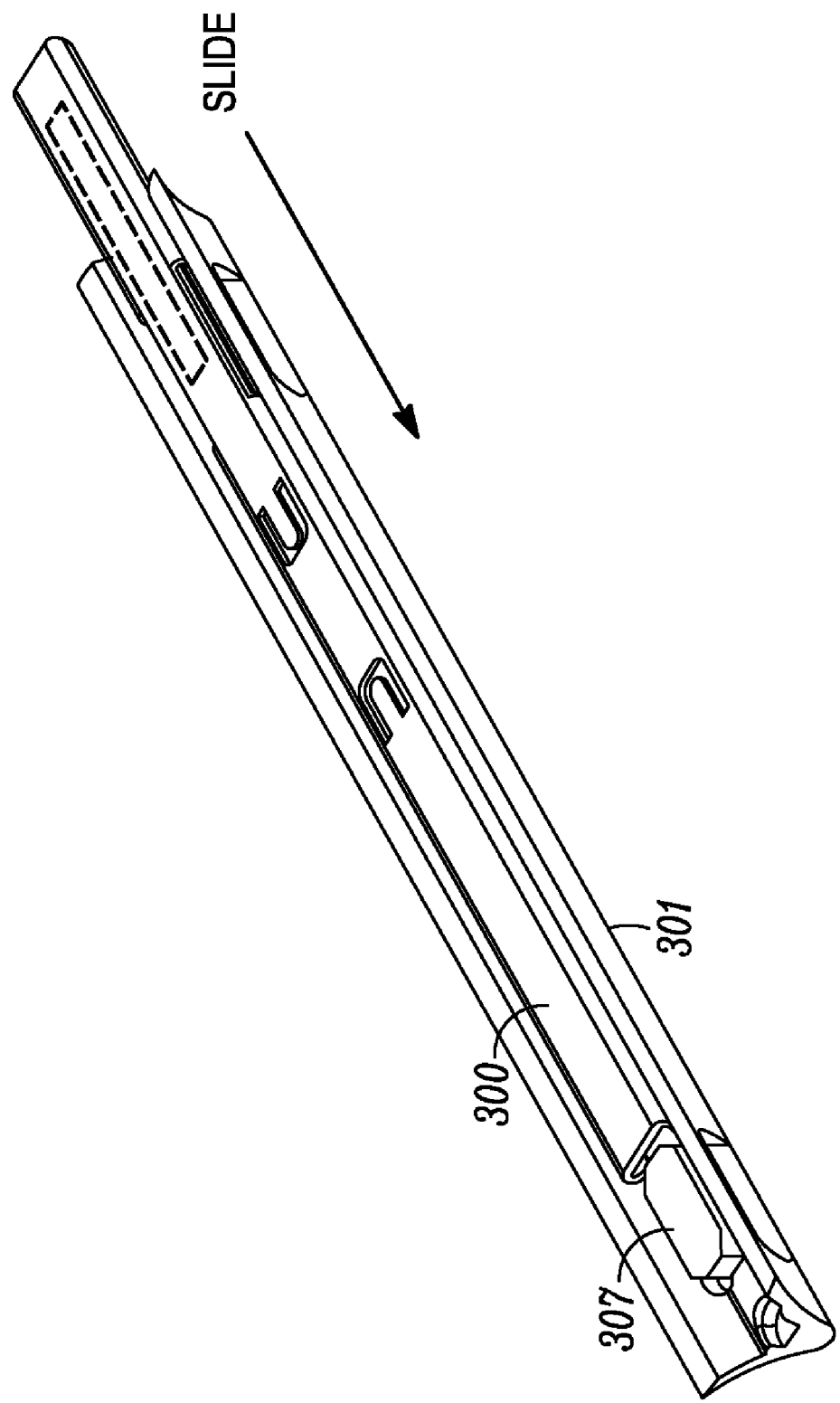
FIG. 5 is a semi-assembled, isometric view of an interconnect in accordance with the invention.
Figure 6:
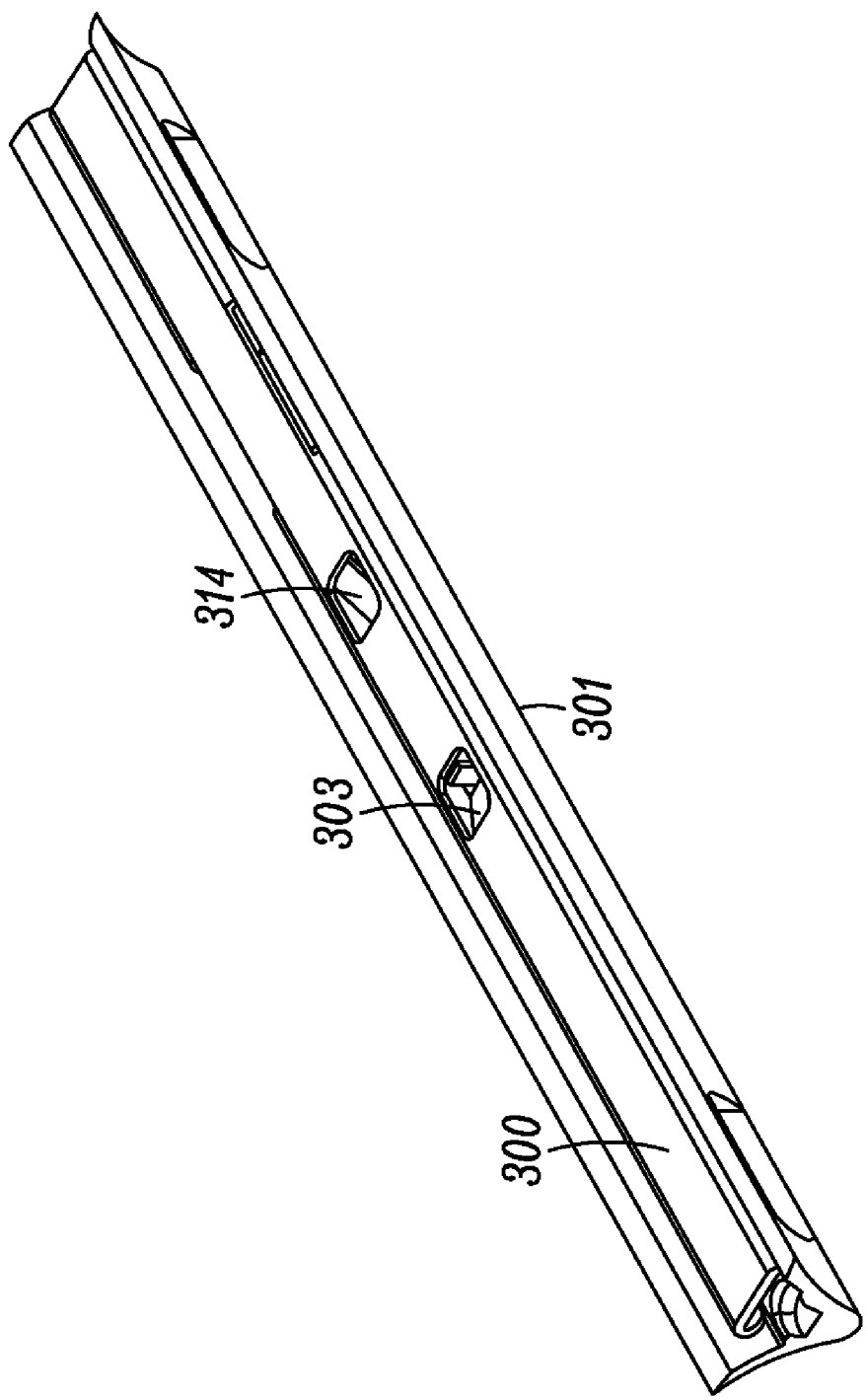
FIG. 6 is an assembled, isometric view of an interconnect in accordance with the invention.
Figure 8:
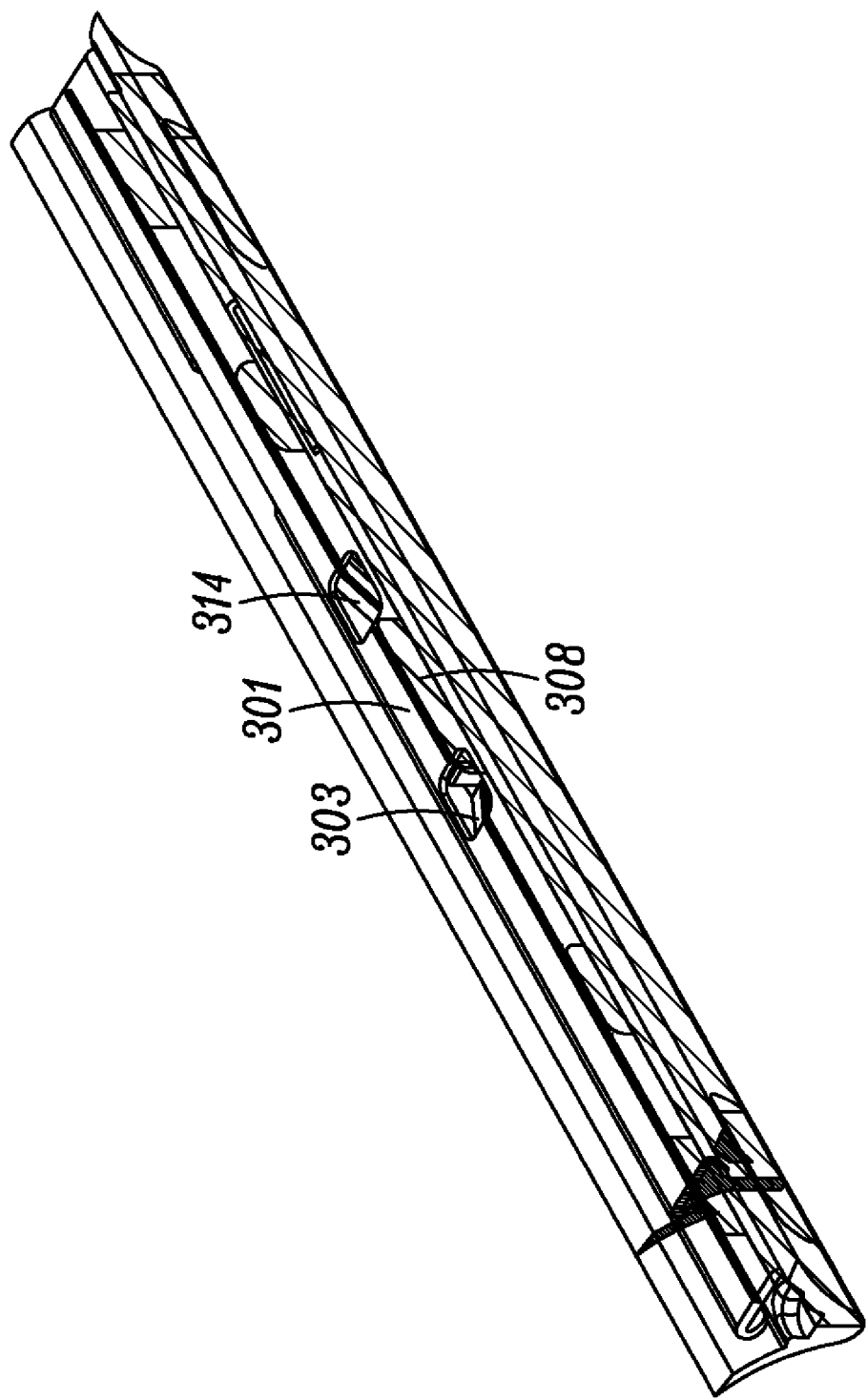
FIG. 8 is a sectional, isometric view of an interconnect in accordance with the invention.

Referring now to FIG. 5, the tab 300 is coupled to the housing 301. An operator then slides the tab 300 along the housing 301 across the rail 307. Referring now to FIG. 6, once the tab 300 has been aligned with the housing 301, the lances 303, 314 are bent downward, so as to engage the sides of the post, thereby preventing any post-assembly, lateral motion between the tab 300 and housing 301. The engagement of the post and lances is illustrated in the sectional view of FIG. 8.

Figure 9:
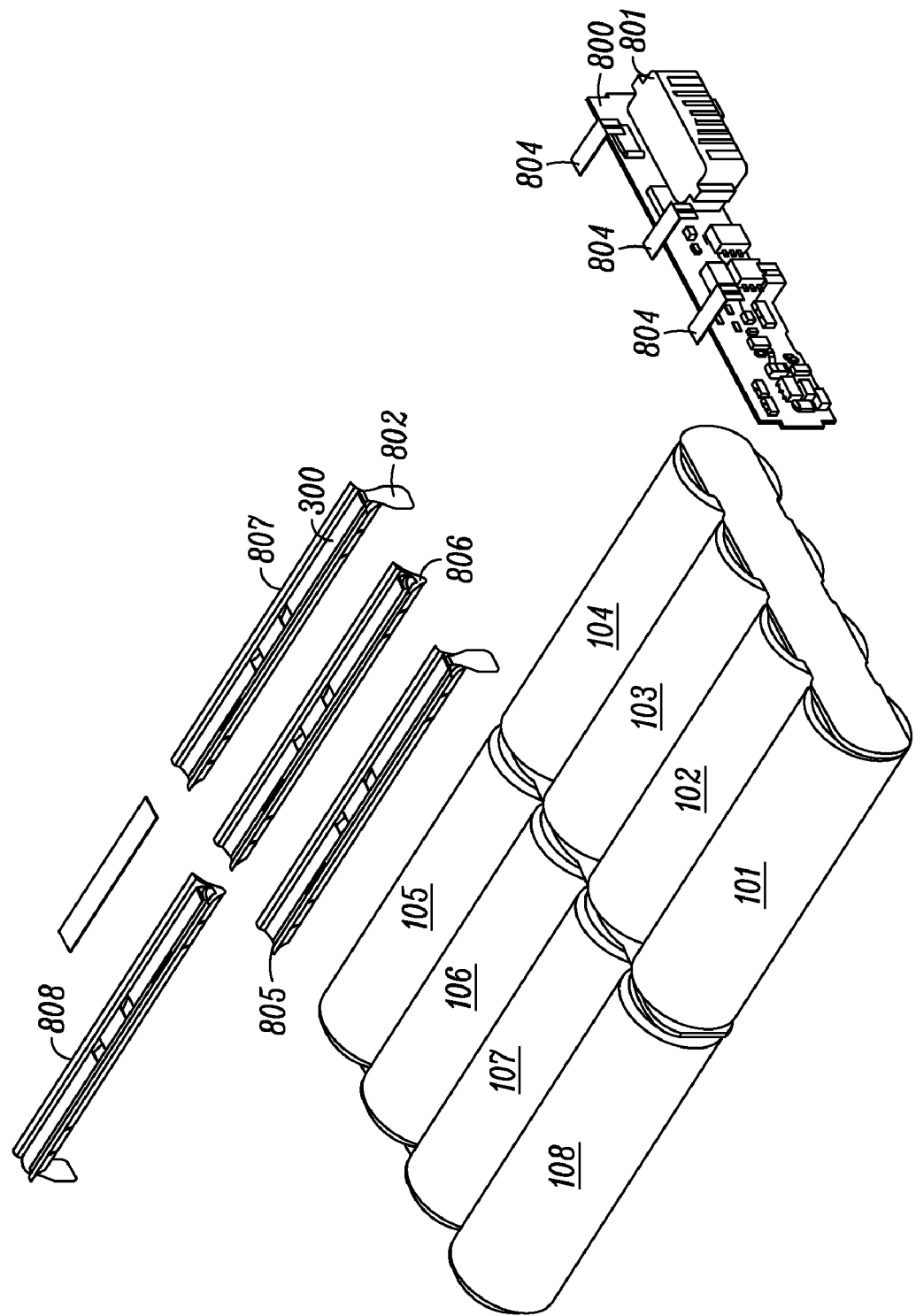
FIG. 9 is an exploded, isometric view of a battery pack in accordance with the invention.

Referring now to FIG. 9, illustrated therein is an exploded view of a cell arrangement 101–108 with the components of the interconnect structure in accordance with the invention. The ultimate goal of the invention is to connect the cells 101–108 to a printed circuit board 800. The printed circuit board 800 includes conductive traces and associated circuitry, which may include battery protection circuits, microprocessor circuits, fuel gauging circuits and charging circuits. The conductive traces facilitate, among other things, delivery of power from the cells 101–108 to a connecter 801 that ultimately delivers the power to the host device.

As illustrated, the terminals 804 are electrically coupled to the printed circuit board 800. The preferred method of coupling is by way of a soldering process, although other methods like hot bar welding may be used as alternatives. The board 800 is oriented such that the terminals 804 align with the metal tabs 300 of the runners 805–807. The runners 805–807 are aligned such that optional perpendicular members, e.g. 802, align with the metal tabs on the cell terminals.

Figure 10:
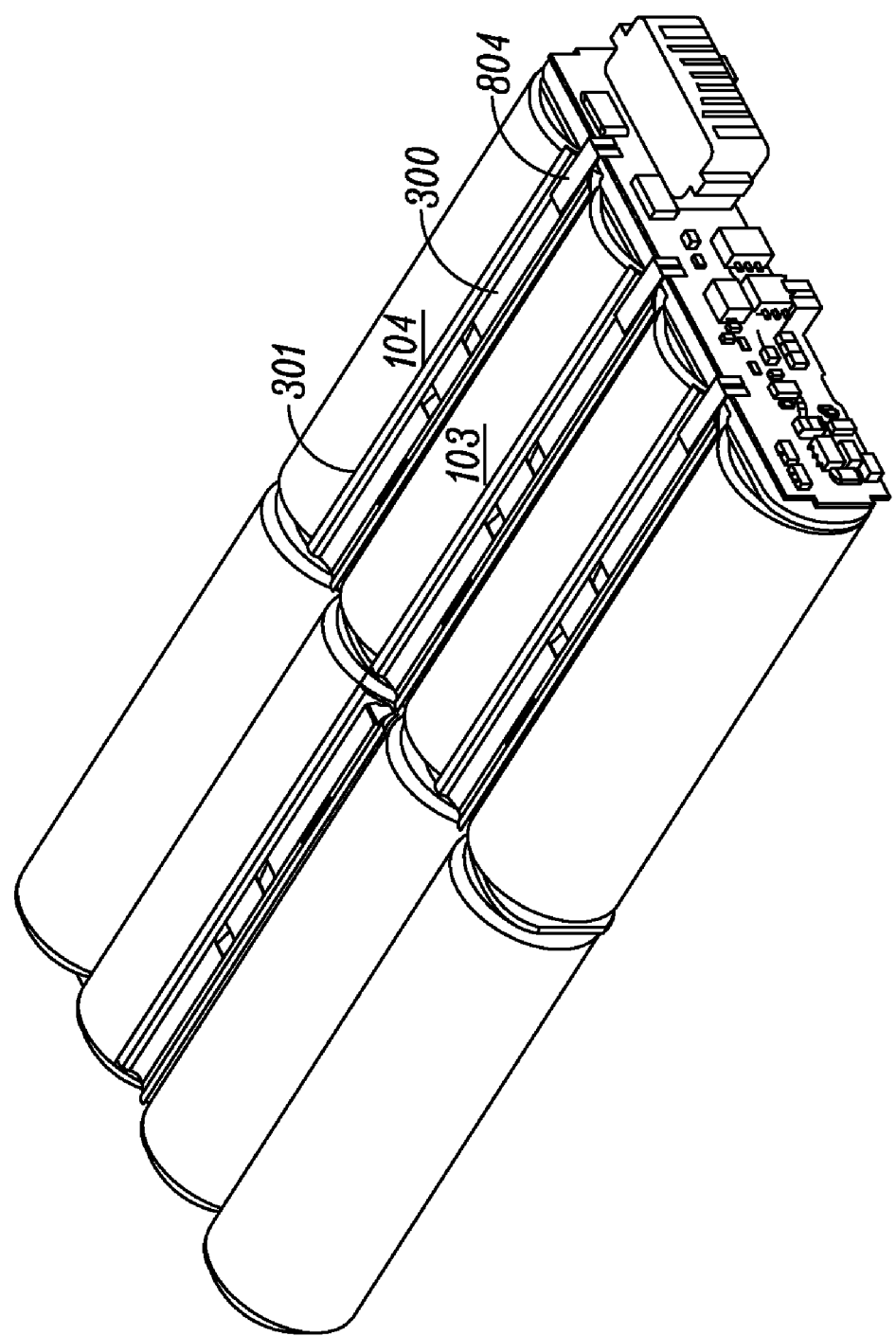
FIG. 10 is an assembled, isometric view of a battery pack in accordance with the invention.

Referring now to FIG. 10, illustrated therein is a rechargeable battery assembly with an interconnect structure in accordance with the invention. The terminals 804 have been welded to the runner metal tabs 300. The welding process is preferably carried out by way of spot welding, although pinch welding, resistance welding, hot barring and soldering will also work.

The housings, e.g. 301, have been seated between adjoining cells 103, 104. Note that in addition to facilitating a welding process, thereby improving efficiency, the housings 301 also provide an extra insulating function. The insulating function prevents tabs from shorting to either tabs or other cell housings.

While FIG. 10 is an exemplary embodiment, it represents an embodiment that will accommodate many laptop batteries. The structure includes eight 18–650 cells, in serial combinations of pairs of parallel cells. Four runners are used. The net result is a low-cost, high reliability interconnect system that may be implemented in mass production facilities. While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while thermal events have been discussed herein as exemplary ways that serial elements may be taken out of saturation, it will be clear to those of ordinary skill in the art that other events, including cells reaching a termination voltage, could also cause the impedance of serial elements to increase.

What is claimed is:

1. An electrically conductive interconnect member, comprising:
   a. a metal tab, the metal tab comprising:
      i. at least one side bend projecting beneath the metal tab wherein the at least one side bend farther comprises at least one cut out; and
      ii. at least one lance;
   b. a housing, the housing comprising:
      i. a rail; and
      ii. a post for coupling to the at least one lance when the at least one lance is bent downward toward the housing.

2. The member of claim 1, wherein the at least one side bend is non-perpendicular with a top of the metal tab.

3. The member of claim 2, wherein a cross section of the rail geometrically corresponds to an area between the at least one side bend and the top of the metal tab.

4. The member of claim 3 wherein the metal tab is less than 1 mm thick.

5. The member of claim 1, wherein a cross section of the housing is Y-shaped.

6. The member of claim 5, wherein outer surfaces of the Y-shape comprise concave surfaces.

7. The member of claim 6, wherein the at least one side bend is crimped against the rail so as to exert frictional forces against the rail.

8. The member of claim 1, wherein the metal tab comprises at least a first and at least a second lance.

9. The member of claim 8, wherein the width of the post is less than or equal to the distance between the first and second lance.

10. A rechargeable battery assembly, comprising:
    a. a plurality of rechargeable cells, wherein a subset of the plurality of rechargeable cells has been electrically coupled with a plurality of flexible metal tabs;
    b. a plurality of interconnect members comprising a metal tab and a housing, the metal tab including at least one side bend projecting beneath the metal tab and at least one lance wherein the at least one side bend further comprises at least one cut out, and the housing including a rail and a post for coupling to the at least one lance when the at least one lance is bent downward toward the housing; and
    c. a printed circuit board;
    wherein the plurality of rechargeable cells are arranged in parallel rows of two cells, the two cells being disposed end to end.

11. The assembly of claim 10, wherein the flexible metal tabs are coupled to the interconnect members by a method selected from the group consisting of spot welding, soldering and pinch welding.

12. The assembly of claim 11, wherein the plurality of rechargeable cells comprises eight cells, disposed in four parallel rows of two end to end cells.

13. The assembly of claim 12, wherein the plurality of interconnect members comprises four interconnect members.

14. The assembly of claim 10, wherein the housing is manufactured from a material selected from the group consisting of styrene, polystyrene, ABS, polycarbonate resin, and polycarbonate-ABS resin.

* * * * *